United States Patent [19]
Bushman

[11] Patent Number: 5,384,802
[45] Date of Patent: Jan. 24, 1995

[54] LASER APPARATUS

[75] Inventor: Boyd B. Bushman, Lewisville, Tex.

[73] Assignee: Lockheed Corporation, Fort Worth, Tex.

[21] Appl. No.: 965,004

[22] Filed: Oct. 20, 1992

[51] Int. Cl.$^6$ .............................................. H01S 3/09
[52] U.S. Cl. ....................... 372/89; 372/58; 372/90; 359/345; 359/346
[58] Field of Search .................. 372/89, 58, 90; 359/345, 346

[56] References Cited

U.S. PATENT DOCUMENTS

| | | | |
|---|---|---|---|
| 3,716,342 | 2/1973 | Matthews et al. | 372/90 |
| 3,898,584 | 8/1975 | Born | 359/345 |
| 3,899,749 | 8/1975 | Hill et al. | 359/346 |
| 4,013,976 | 3/1977 | Hill et al. | 372/90 |
| 4,320,358 | 3/1982 | Heidmann et al. | 372/90 |
| 4,553,243 | 11/1985 | Rosenwaks et al. | 372/89 |
| 4,672,620 | 6/1987 | Slusher et al. | 372/58 |
| 4,713,823 | 12/1987 | Smith | 372/58 |
| 4,928,286 | 5/1990 | Foreman et al. | 372/90 |

FOREIGN PATENT DOCUMENTS 2456759 8/1976 Germany.
2740238 3/1979 Germany.

Primary Examiner—Nelson Moskowitz
Attorney, Agent, or Firm—James E. Bradley

[57] ABSTRACT

A laser device utilizes a turbojet engine to provide a stimulation source. The turbojet engine is conventional, having a compression section, a fuel injection and igniting section, and an afterburner section. A pair of mirrors are mounted adjacent the hot gaseous stream produced by the turbojet engine. One of the mirrors is fully reflective and the other is partially reflective. The mirrors face each other and are perpendicular to the flow of the gaseous stream, creating a reflection path that is transverse to the flow. The high temperature creates excited molecules in the gaseous stream. This results in photons being emitted, which when striking other excited atoms which emit photons of the same wavelength, create additional photons to combine into a laser beam travelling along a reflection path between the mirrors. A portion of the laser beam passes through the partially reflecting mirror where it strikes an inclined mirror that aims the beam toward a desired target.

31 Claims, 3 Drawing Sheets

LASER APPARATUS

BACKGROUND OF INVENTION

1. Field of Invention

This invention relates in general to lasers, and in particular, to a device for initiating a laser beam using a turbojet engine plume or equivalent.

2. Description of Prior Art

Several types of lasers exist. In one type, a gas such as carbon dioxide, is maintained in a chamber at a very low pressure. By using light, heat, or electricity, molecules in the gas are excited. The atoms in the molecules have electrons which reach higher energy levels. When an electron of an atom drops to a lower energy level, the atom emits a photon. If an emitted photon strikes another atom when the atom is in an excited state, another photon will be emitted from the atom if the atom is of a type that emits photons of the same wavelength as the striking photon. Both photons then proceed in the same direction at the speed of light. If each of the two photons strikes an excited atom which emits photons of the same wavelength, then four photons will be travelling in the same direction.

In a laser, a fully reflective mirror is located on one side of the stimulated atoms and a partially reflective mirror is on the other side of a gas chamber. The photons in the gas chamber travel back and forth between the mirrors, striking excited atoms and gathering in number and thus energy exponentially with each reflection up to a maximum level. A small portion of the photon beam, typically about three percent, passes through the partially reflective mirror with each strike. The beam passes through the partially reflective mirror as light energy known as a laser.

A problem in achieving higher energy laser beams is in stimulating and maintaining the molecules in a stimulated condition. If a photon strikes an atom that is not in an excited energy condition, the atom will absorb the photon and become stimulated to a higher energy level. However, a photon will not be emitted. The photon beam bouncing between the mirrors loses energy for each photon captured. A dense gas potentially can be used to create a higher energy laser beam because it has more molecules than a less dense gas, and thus potentially could produce a larger number of photons travelling between the mirrors. However, with a dense gas it is difficult to maintain stimulation of molecules. Too many molecules will not be at an exited state, thus capturing too many photons. Generally, lasers use only a gas with only one type of molecule and at a very low pressure, much less than atmospheric. In this manner all of the emitted photons will be at the same wavelength.

In a gas dynamic laser, the pressure is somewhat higher, but typically still less than one PSI. The gas dynamic laser utilizes a fuel, a burning chamber, and igniter to ignite the fuel. The burning creates a hot gaseous stream, which contains a large number of excited molecules. The hot gaseous stream is drawn and exhausted by a positive exhaust system into the atmosphere. The mirrors are placed across the flowing gaseous stream, creating a reflection path for photons emitted from excited atoms struck by other photons. The photons in this beam are filtered spectrally so as to filter all but a single wavelength. A small portion of the beam passes through the partially reflective mirror.

In a dynamic gas laser, a higher energy laser can potentially be achieved than with a static gas type. However, it is an expensive, large and complex system. Also, energy levels achieved to date have not been sufficient so as to be able to burn metal, unless the beam dwells on the metal for a considerable time, such as one second. Gas dynamic lasers are not yet feasible for weapons on aircraft because of the large size and because of the inability to burn metal almost instantly.

SUMMARY OF THE INVENTION

In this invention, a light energy beam is provided that is produced by a source such as a turbojet engine. The source has means for compressing a gas, such as oxygen, mixing the compressed gas with a fuel to create a combustible mixture, then igniting the mixture and discharging the mixture to produce a hot gaseous stream flowing outward from the source.

A fully reflective mirror and a partially reflective mirror are mounted spaced apart and facing from each other to define a reflection path through which the hot gaseous stream passes. The source produces temperatures high enough so as to cause electrons associated with atoms in the gaseous stream to reach an excited state to emit photons. Each of these photons when striking atoms in a similar excited state and which are of the type which emit photons of the same wavelength, emit photons to create a laser beam travelling back and forth between the mirrors.

An aiming means locates in the reflection path outside of the mirrors. A portion of the beam passes through the partially reflective mirror and strikes the aiming device, which will aim the beam toward a target. Preferably, the aiming device comprises a movable mirror that is mounted at an inclination relative to the reflection path.

DETAILED DESCRIPTION OF INVENTION

Figure 1:
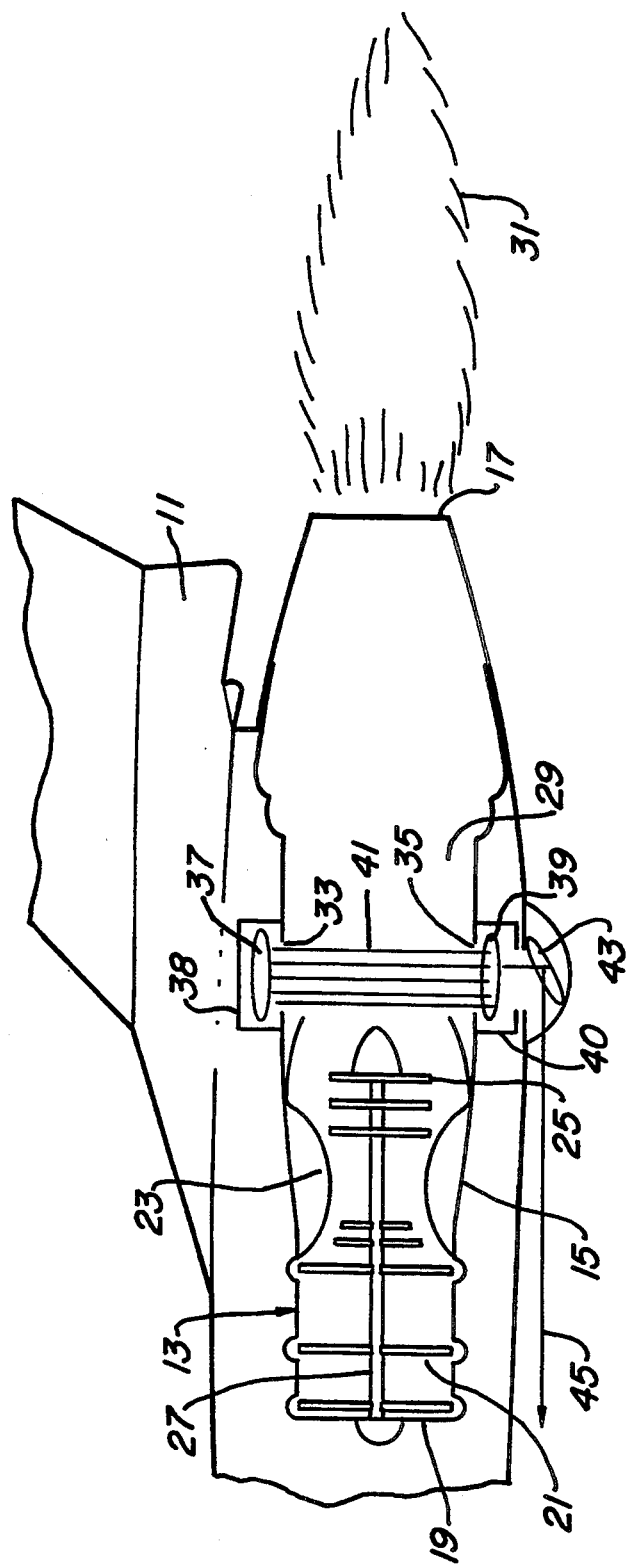
FIG. 1 is a schematic sectional view of a turbojet engine having a laser apparatus constructed in accordance with this invention.

Referring to FIG. 1, aircraft 11 is a conventional military type, having a turbojet engine 13. The turbojet engine 13 is also conventional in its propulsion characteristics. Turbojet 13 has a tubular housing 15. The rear or downstream end of housing 15 comprises a nozzle 17 that has an orifice that can be varied in diameter. The forward or upstream end of housing 15 has an intake 19 for drawing in air.

Turbojet engine 13 has a number of compression stages 21. Compression stages 21 comprise a centrifugal high speed compressor for compressing the air being drawn in intake 19. A burn can or injection section 23 locates immediately rearward of compressive stages 21. Injection section 23 injects a fuel and ignites the fuel and compressed air mixture. This area is constricted somewhat in diameter from the compression stages 21. The mixed fuel and air burn in this injection section 23.

A set of turbine wheels 25 locate directly downstream from the injection section 23. Turbine wheels 25 are mounted to a shaft 27 which extends forward and drives the compression stages 21. The high speed, hot, rearward travelling gaseous stream 31 spins the turbine wheels 25 to rotate the shaft 27.

The hot gaseous stream 31 exits the turbine wheels 25 and passes through an afterburner chamber 29 where additional injectors and igniters are present to cause further burning when in an afterburning condition. FIG. 1 shows the gaseous stream 31 exiting the nozzle 17. The static pressure in the engine housing 15 immediately downstream of turbine wheels 25 is much higher than atmospheric, such as 42 pounds per square inch. The temperature at the forward end of the afterburner chamber 29 is approximately 1000 degrees F. during normal military power, and 3750 degrees F. when the afterburner is operating.

Figure 4:
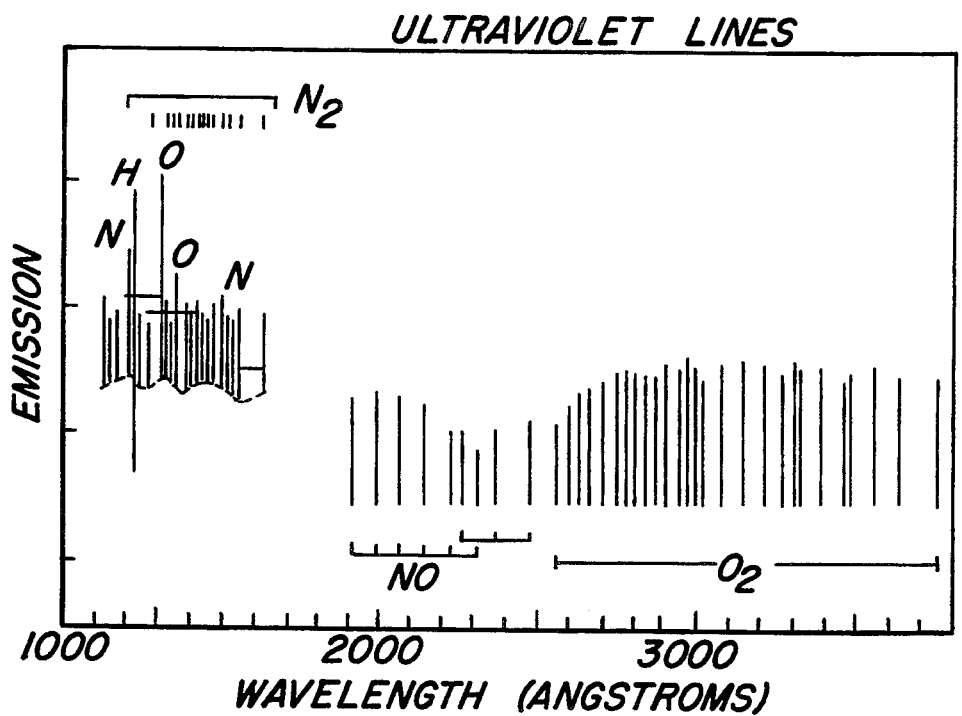
FIG. 4 is a graph of the ultraviolet wavelengths of the various components contained within a high temperature flame.
Figure 5:
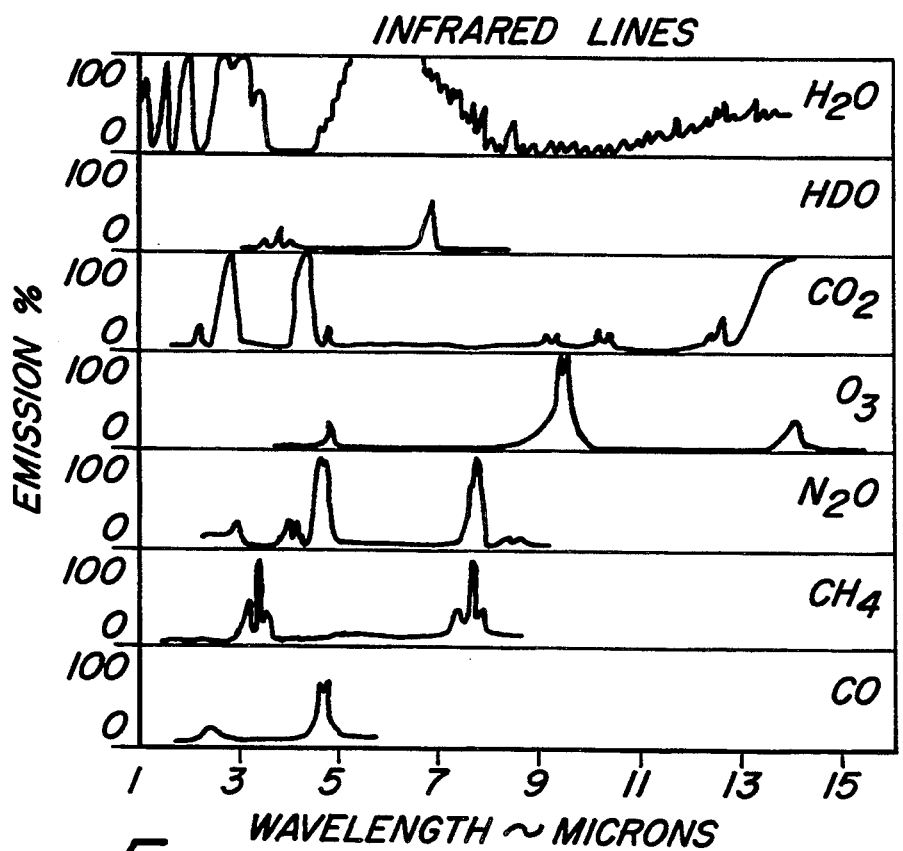
FIG. 5 is a graph illustrating the infrared wavelengths of the various components contained within a high temperature flame.

The gases in the gaseous stream 31 will have a variety of different wavelengths or emission lines. FIGS. 4 and 5 depict measurements of a hot flame, particularly resulting from a missile. The emission lines from a turbojet engine 13 will be similar. As shown in FIG. 4, a number of the emission lines will be in the ultraviolet region. The components include nitrogen atoms and molecules, oxygen atoms and molecules, hydrogen, and nitrous oxide. Each vertical line illustrated in FIG. 4 represents a different wavelength that will exist for photons that may be emitted from the various components. The vertical scale of FIG. 4 is arbitrary, but indicates greater amounts of photons emitted of certain wavelengths than of other wavelengths.

The vertical scale of FIG. 5 is also arbitrary, and shows a number of emission lines that exist in the infrared region. Greater amounts of certain wavelengths exist than others, such as the wavelengths around five microns for carbon monoxide. The components of a hot flame which emit photons in the infrared include water, hydrogen deuterium oxide, carbon dioxide, nitrous oxide, methane and carbon monoxide. The gaseous stream 31 contains molecules, many of which will be in an excited state, with atoms having electrons in a higher energy level due to the high temperature. These molecules will emit photons in the various wavelengths shown in FIGS. 4 and 5.

Referring again to FIG. 1, a laser or light energy beam is created in the gaseous stream 31 by means which includes apertures 33, 35 located 180° apart from each other in the sidewall of housing 15. Apertures 33, 35 face each other and are located on a line that is perpendicular to the longitudinal axis of housing 15. Apertures 33, 35 are open holes. Apertures 33, 35 are preferably located immediately downstream from turbine wheels 25 and at the upstream end of afterburner chamber 29. A cooler stream of air is created by turbojet engine 13 in the annular space close to the wall of housing 15 to keep the metal of housing 15 as cool as possible. Apertures 33, 35 thus will located within this cooler stream of air.

Figure 2:
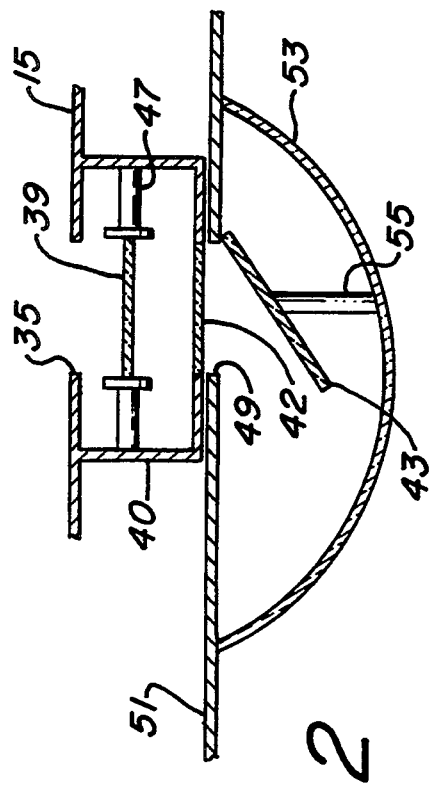
FIG. 2 is an enlarged schematic view of a portion of the laser apparatus of FIG. 1.

A fully reflective mirror 37 is mounted in aircraft 11 on the outside of aperture 33, exterior of housing 15. Mirror 37 is mounted in a sealed mirror housing 38 which attaches to the exterior of engine housing 15 surrounding aperture 33. Similarly, a partially reflective mirror 39 is mounted immediately exterior of aperture 35. As shown in FIG. 2, mirror 39 is mounted in a sealed mirror housing 40 which attaches to engine housing 15 surrounding aperture 35. Mirrors 37, 39 are flat, contained in parallel planes when in operation, and face each other. Partially reflective mirror 39 is approximately 97 percent reflective. That is three percent of a light beam will be able to pass through partially reflective mirror 39.

The excited atoms of the molecules contained in gaseous stream 31 emit photons. These photons will travel along reflection path 41 between mirrors 37, 39. The reflection path 41 is perpendicular to mirrors 37, 39 and perpendicular to the longitudinal axis of housing 15. The photons travel and bounce back and forth numerous times between the mirrors 41, gaining additional photons due to the striking of photons with excited atoms that emit photons of the same wavelength. The energy level of the resulting laser beam 45 grows geometrically with each reflection from mirror 37 to mirror 39. A portion of the laser beam 45, approximately three percent, will pass through the partially reflective mirror 39 each time the light beam 45 strikes partially reflective mirror 39.

A closed window 42 is located in alignment with reflection path 41 exterior of partially reflective mirror 39. Window 42 is located in mirror housing 40 and is constructed of a material which will pass a wide range of wavelengths, particularly those shown in FIGS. 4 and 5. Suitable materials which will pass ultraviolet and well as infrared include calcium fluoride and sapphire. Most of the wavelengths of laser beam 45 pass through window 42.

As shown in FIG. 2, partially reflective mirror 39 is mounted to mirror housing 40 by a mechanism or mounting system 47 that is electronically controlled and which will tilt mirror 39 slightly relative to reflection path 41. When tilted or canted slightly, mirror 39 is no longer parallel to mirror 37 and the travel back and forth of laser beam 45 on reflection path 41 ceases. A variety of devices can be employed to move the mirror 39 between an aligned position and a tilted position.

Referring still to FIG. 2, an aiming means locates in alignment with the reflection path 41, but outside of the partially reflective mirror 39 and outside of window 42. The aiming device comprises an aiming mirror 43, which is located exterior of the fuselage 51 of aircraft 11 within a bubble 53. Bubble 53 is preferably of a material, such as described above, that will pass a wide range of wavelengths from ultraviolet to infrared. Aiming mirror 43 is also a flat mirror that is fully reflective. Aiming mirror 43 is mounted to a mechanism or mounting system 55 that allows it to rotate up to 360° and also tilt to change its inclination relative to reflection path 41. A variety of mechanisms are available for accomplishing this movement. An electronic guidance system will be employed to control the movement of aiming mirror 43. Aiming mirror 43 will be always inclined relative to the reflection path 41 so as to direct the laser beam 45 away from aircraft 11 as indicated by the arrow in FIG. 1.

Figure 3:
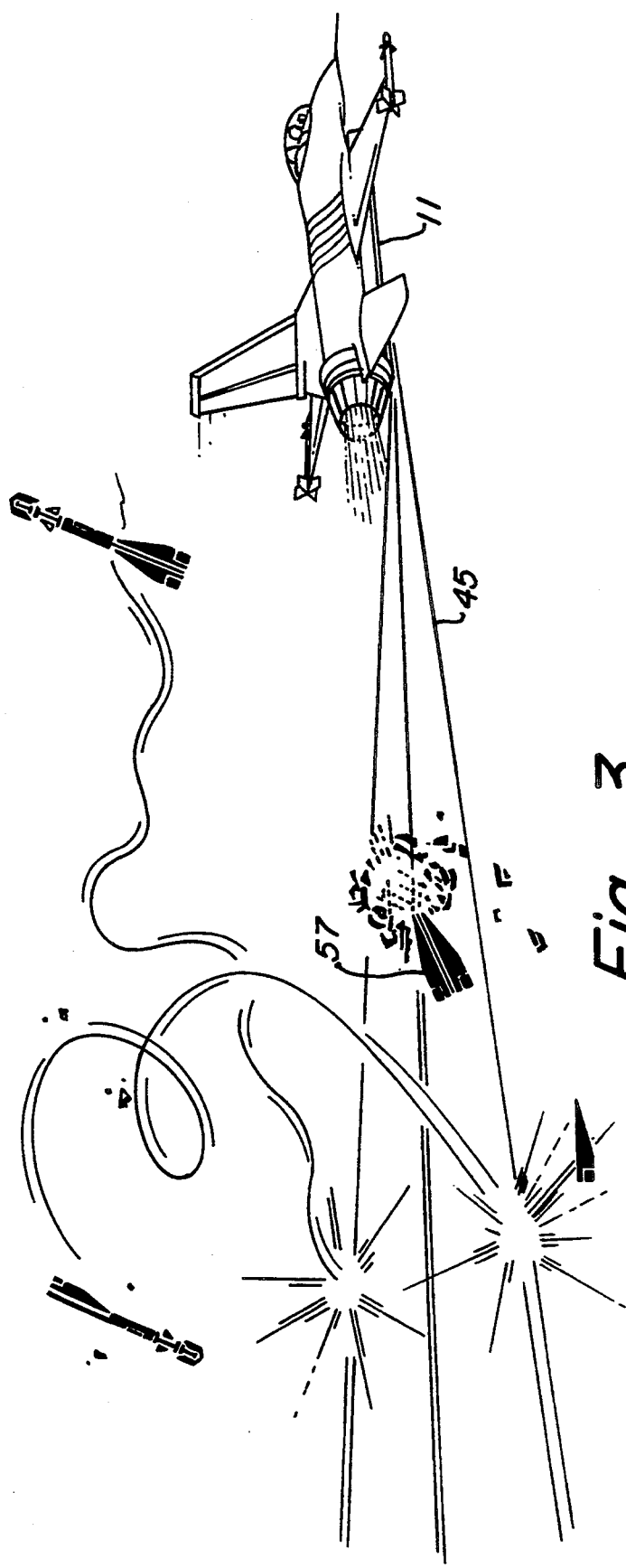
FIG. 3 is a perspective view illustrating an aircraft having a laser apparatus constructed in accordance with the invention, and shown striking a number of targets.

FIG. 3 illustrates the operation of the apparatus. A variety of targets 57 are shown being struck by the laser beam 45. The laser beam 45 can be directed in a number of different directions by the mounting device 55 (FIG. 2) which moves aiming mirror 43.

The amount of power available for the beam 45 is much more than in prior art types, even gas dynamic lasers. The fuel flow rate of gaseous stream for a turbojet engine 13 for use in an F-16 aircraft is 12,000 lbs. per hour maximum without the afterburner chamber 29 being activated. With the afterburner chamber 29 being activated, the fuel flow rate of the gaseous stream is 80,000 lbs. per hour. Each photon emitted from the components of FIG. 4 and 5 has an energy level, and as each component contributes to the light energy beam, the magnitude can be a very large amount.

In operation, the jet engine 13 will operate in a normal manner. Air is compressed by the compression stages 21, ignited in the ignition section 23 into a plasma or hot gaseous stream 31 that flows past turbine blades 25. The turbine blades 25 in turn drive the compression stages 21. Gaseous stream 31 will flow through the afterburner section 29 at a high static pressure, several times that of atmospheric, at a high flow rate, and at a very hot temperature.

Normally, mounting device 47 (FIG. 2) will have partially reflective mirror 39 positioned in an off position, slightly canted relative to fully reflective mirror 37. Consequently no photons moving in the hot gaseous stream will reflect back and forth along reflection path 41. When the pilot wishes to utilize the apparatus to create a laser beam, electronic control circuitry and mounting device 47 will shift partially reflective mirror 39 to the on position, parallel with fully reflective mirror 37. Also, guidance control circuitry and mounting device 55 will position aiming mirror 43 to aim laser beam 45 at one of the targets 57 (FIG. 3).

A large portion of the molecules contained within the plasma of the gaseous plume 31 will be in an excited condition due to the high temperatures. The atoms will have electrons in higher energy levels than in the natural state. Photons will be emitted by these atoms as the electrons drop to lower energy levels. These photons, if striking another atom which is in an excited state and which emits photons of the same wavelength, create a second photon. The two photons then travel at the same speed, which is the speed of light, and in the same direction. If they strike additional atoms in excited states which are of a type that emit photons of the same wavelength, they create additional photons travelling along the reflection paths 41. The high flow rate of the gaseous stream 31 assures a continuous stream of excited molecules flowing past at a very fast rate.

The photons travel back and forth between the reflective mirror 37 and partially reflective mirror 39, gathering strength geometrically. A small portion of laser beam 45 passes through partially reflective mirror 39 each time the photons strike the mirror 39. Laser beam 45 increases geometrically in energy as the energy of the photons reflecting back and forth between mirrors 37, 39 increase in energy. The beam 45 strikes aiming mirror 43 and is directed out bubble 53 toward one of the targets 57 illustrated in FIG. 3. The action of the photons reflecting back and forth and passing through the partially reflective mirror 39 is essentially instantaneous. Once the beam strikes the target or fires, control circuitry will move mounting device 47 to shift partially reflective mirror 39 back to the off position.

The invention has significant advantages. The structure is fairly simple, adding little weight or complexity to an existing military aircraft. The stimulation source is available as it is a part of the propulsion system. The amount of energy available is extremely high. The potential energy level is high enough to instantly burn through metal without requiring any dwell time.

While the invention has been shown in only one of its forms, it should be apparent to those skilled in the art that it is not so limited but is susceptible to various changes without departing from the scope of the invention.

I claim:

1. An apparatus for producing a laser beam, comprising in combination:
   source means for compressing a gas, mixing the compressed gas with a fuel to create a combustible mixture, igniting the mixture and discharging the mixture to produce a hot gaseous stream flowing outward from the source means along a longitudinal axis of the source means at a pressure greater than atmospheric;
   a fully reflective mirror;
   a partially reflective mirror;
   mounting means for mounting the mirrors spaced apart from and facing each other to define a reflection path which passes through the gaseous stream at a point where the pressure of the gaseous stream is at a pressure greater than atmospheric; and
   the temperature of the gaseous stream being sufficient to cause electrons associated with atoms contained in molecules located in the reflection path to reach an excited state to emit photons, each of which when striking another atom in an excited state within the reflection path and of a type that emits photons of the same wavelength, creates a second photon, the photons travelling back and forth between the mirrors to create a laser beam, a portion of which passes through the partially reflective mirror.

2. The apparatus according to claim 1 wherein the source means is a turbojet engine, and wherein the longitudinal axis of the source means passes through the reflection path.

3. The apparatus according to claim 1 wherein the reflection path is transverse to the longitudinal axis of the gaseous stream, and wherein the longitudinal axis of the source means passes through the reflection path.

4. The apparatus according to claim 1 wherein the reflection path is perpendicular to the longitudinal axis of the gaseous stream, and wherein the longitudinal axis of the source means passes through the reflection path.

5. The apparatus according to claim 1 wherein the source means includes a housing with a nozzle at a rearward end for discharge of the gaseous stream, and wherein the mounting means mounts the mirrors so as to place the reflection path in the housing upstream of the nozzle, and wherein the pressure of the gaseous stream at the mirrors is substantially the same as the pressure at the discharge of the source means.

6. The apparatus according to claim 1 wherein the apparatus includes an aircraft, and wherein the source means comprises a turbojet engine mounted to the aircraft for propelling the aircraft, and wherein the apparatus is free of any structure between the mirrors and the source means for reducing the pressure of the gaseous stream prior to reaching the mirrors.

7. The apparatus according to claim 1, further comprising:
   aiming means mounted in alignment with the reflection path for changing the direction of the laser beam which passes through the partially reflective mirror.

8. The apparatus according to claim 1, further comprising:
   aiming means mounted in alignment with the reflection path for changing the direction of the laser beam after passing through the partially reflective mirror, the aiming means comprising a movable mirror mounted at an inclination relative to the reflection path.

9. The apparatus according to claim 1 wherein the reflection path is transverse to the longitudinal axis of the gaseous stream and wherein the apparatus further comprises:
aiming means mounted in alignment with the reflection path for changing the direction of the laser beam after passing through the partially reflective mirror, the aiming means comprising a movable mirror mounted at an inclination relative to the reflection path.

10. The apparatus according to claim 1 wherein the photons which make up the laser beam passing through the partially reflective mirror have a plurality of different wavelengths, and wherein the apparatus is free of any structure for injecting fuel into the gaseous stream between the mirrors and the source means.

11. The apparatus according to claim 1 wherein the source means provides an annular layer of cooling gas at the perimeter of the gaseous stream, and wherein the mirrors are cooled by the annular layer of cooling gas.

12. In an aircraft having a turbojet propulsion system which produces a hot gaseous stream exhausting along a longitudinal axis from the aircraft, an apparatus for producing a laser beam to be used as a weapon, comprising in combination:
a fully reflective mirror;
a partially reflective mirror;
mounting means for mounting the mirrors to the aircraft spaced apart from and facing each other to define a reflection path which locates in an undeflected portion of the gaseous stream and is intersected by the longitudinal axis, the hot gaseous stream creating a laser beam which passes through the partially reflective mirror; and
aiming means mounted to the aircraft for changing the direction of the laser beam after passing through the partially reflective mirror to direct the laser beam toward a target.

13. The apparatus according to claim 12 wherein the propulsion system has a housing with a nozzle at a rearward end through which the gaseous stream exhausts, and wherein the mounting means mounts the mirrors so as to place the reflection path within the housing where the pressure of the gaseous stream is substantially the same as at the discharge of the turbojet propulsion system.

14. The apparatus according to claim 12 wherein the reflection path is transverse to the longitudinal axis of the aircraft, and wherein the turbojet propulsion system is free of any structure located between the turbojet propulsion system and the reflection path that reduces the pressure of the gaseous stream.

15. The apparatus according to claim 12 wherein the propulsion system has a housing with a nozzle at a rearward end through which the gaseous stream exhausts, and wherein the mounting means mounts the mirrors with the reflection path transverse to the longitudinal axis and located within the housing, and wherein the pressure of the gaseous stream at the reflection path is greater than atmospheric.

16. The apparatus according to claim 12 wherein the propulsion system has a housing with a nozzle at a rearward end through which the gaseous stream exhausts, and wherein the mounting means mounts the mirrors with the reflection path transverse to the longitudinal axis and located within the housing, wherein the turbojet propulsion system produces a cooling stream of gas around the perimeter of the gaseous stream and in contact with the housing, and wherein the mirrors are cooled by the cooling stream of gas.

17. The apparatus according to claim 12 wherein:
the propulsion system has a housing with a nozzle at a rearward end through which the gaseous stream exhausts;
the mounting means mounts the mirrors with the reflection path in the housing transverse to the longitudinal axis; and the apparatus is free of any means for injecting fuel into the gaseous stream between the mounting means and the propulsion system.

18. The apparatus according to claim 12 wherein the propulsion system has an injection section for injecting fuel for combustion for the propulsion system, and wherein the gaseous stream consists only of gases produced by the injection section, being free of any fuel injected subsequent to the injection section for laser production, and wherein the laser beam is created by electrons associated with atoms contained in molecules of the gaseous stream to reach an excited state to emit photons, which when striking another atom within the gaseous stream in an excited state and which emits photons of the same wavelength, creates a second photon, the photons travelling back and forth in the gaseous stream between the mirrors, creating a laser beam, a portion of which passes through the partially reflective mirror.

19. The apparatus according to claim 12 wherein the photons which make up the laser beam passing through the partially reflective mirror have a plurality of different wavelengths.

20. The apparatus according to claim 12 wherein the photons which make up the laser beam are emitted from atoms of molecules contained in the gaseous stream, and wherein the gaseous stream contains gases produced only by combustion of injected fuel into the propulsion system and is free of any additional fuel injected downstream of combustion for causing laser production.

21. In an aircraft having a turbojet propulsion system which has a housing having a longitudinal axis, the propulsion system having a compressor section and an injection section where hydrocarbon fuel is introduced and ignited for producing a hot gaseous stream flowing through a rearward portion of and exhausting from the housing, the rearward portion of the housing having an annular interior wall portion that is located on a longitudinal axis of the compressor section, the propulsion system also producing an annular cooling stream of gas surrounding the hot gaseous stream and flowing along the interior wall portion of the housing, an apparatus for producing a laser beam to be used as a weapon, comprising in combination:
a pair of mirrors mounted to the aircraft in opposition to each other so as to define a reflection path passing through gaseous stream in the housing, the mirrors being located adjacent the interior wall portion of the housing transverse to the longitudinal axis, the cooling stream providing cooling for the mirrors;
one of the mirrors being fully reflective and the other being partially reflective;
the hot gaseous stream causing electrons associated with atoms contained in molecules of the gaseous stream to reach an excited state to emit photons, each of which when striking another atom in an excited state within the gaseous stream and which emits photons of the same wavelength, creates a second photon, the photons travelling back and forth between the mirrors to create a laser beam, a portion of which passes through the partially reflective mirror; and aiming means, including a movable mirror mounted to the aircraft exterior of the housing and in alignment with the reflection path, for changing the direction of the laser beam after passing through the partially reflective mirror to direct the laser beam toward a target.

22. The apparatus according to claim 21 wherein the interior wall portion of the housing has apertures on opposite sides thereof for the passage of photons emitted from atoms of molecules contained in the gaseous stream, and wherein the mirrors are mounted exterior of the housing adjacent the apertures.

23. The apparatus according to claim 21 wherein the photons which make up the laser beam passing through the partially reflective mirror have a plurality of different wavelengths, wherein the compressor section is driven by a turbine downstream of the ignition section, and wherein the apparatus is free of any means for reducing the pressure of the gaseous stream between the turbine and the mirrors.

24. A method for producing a laser beam, comprising:
compressing a gas;
mixing the compressed gas with a fuel to create a combustible mixture;
igniting the mixture and discharging the mixture to produce a hot gaseous stream flowing outward along a longitudinal axis at a pressure greater than atmospheric and without deflecting the gaseous stream from the longitudinal axis;
mounting a fully reflective mirror and a partially reflective mirror spaced apart from and facing each other about the longitudinal axis to define a reflection path which passes through the gaseous stream at a point where the pressure of the gaseous stream is still greater than atmospheric; and
the heat of the hot gaseous stream causing electrons associated with atoms contained in molecules of the gaseous stream to reach an excited state to emit photons, each of which when striking another atom in an excited state and which is of a type that emits photons of the same wavelength, creates a second photon, the photons travelling back and forth along the reflection path between the mirrors to create a laser beam, a portion of which passes through the partially reflective mirror.

25. The method according to claim 24 wherein the step of compressing the gas comprises compressing the gas with a turbine located downstream of where the mixture is .ignited, and wherein the step of mounting the mirrors comprises mounting the mirrors so that the reflection path is transverse to the longitudinal axis of the gaseous stream and at a point in the gaseous stream where the pressure is substantially the same as the initial pressure after the turbine.

26. The method according to claim 24 wherein the step of mounting the mirrors comprises mounting the mirrors so that the reflection path is perpendicular to the longitudinal axis of the gaseous stream, and wherein the method further comprises producing a cooling stream surrounding the hot gaseous stream and cooling the mirrors with the cooling stream.

27. The method according to claim 24 wherein the gaseous stream is created within a housing which has a nozzle at a rearward end for discharge of the gaseous stream, and wherein the step of mounting the mirrors positions the reflection path in the housing upstream of the nozzle,.and wherein the method further comprises producing a cooling stream in the housing surrounding the hot gaseous stream and cooling the mirrors with the cooling stream.

28. The method according to claim 24 wherein no additional fuel is introduced into the hot gaseous stream following ignition and combustion upstream of the mirrors.

29. The method according to claim 24 wherein no additional fuel is introduced into the hot gaseous stream to cause laser production following ignition and combustion upstream of the mirrors, and wherein the step of mixing fuel with compressed gas results in a variety of different types of molecules within the gaseous stream, wherein the photons which make up the laser beam are emitted from atoms from molecules contained within the gaseous stream, and wherein the photons in the laser beam passing through the partially reflective mirror have a plurality of different wavelengths.

30. A method for producing a laser beam for use as a weapon for an aircraft having a turbojet propulsion system which has a housing with a longitudinal axis, and which has a compressor driven by a turbine which compresses air and an ignition section which introduces hydrocarbon fuel and ignites the mixture to produce a hot gaseous stream which discharges from the housing along the longitudinal axis, producing thrust to propel the aircraft, the method comprising:
mounting a fully reflective mirror and a partially reflective mirror spaced apart from and facing each other to define a reflection path which passes through the gaseous stream within the housing and is intersected by the longitudinal axis;
the heat of the hot gaseous stream causing electrons associated with atoms contained in molecules of the gaseous stream to reach an excited state to emit photons, each of which when striking another atom in an excited state within the gaseous stream and which is of a type which emits photons of the same wavelength, creates a second photon, the photons travelling back and forth along the reflection path between the mirrors to create a laser beam, a portion of which passes through the partially reflective mirror;
changing the direction of the laser beam after it has passed through the partially reflective mirror to aim the laser beam at a target; and
wherein the step of mounting the mirrors comprises mounting the mirrors so that the reflection path is transverse to the longitudinal axis of the gaseous stream, and wherein the mirrors are mounted in the housing at a point where the pressure of the gaseous stream is substantially the same as after the turbine.

31. The method according to claim 30 wherein no additional fuel is introduced into the hot gaseous stream to cause laser production following ignition and combustion upstream of the mirrors.

* * * * *